(12) United States Patent
Folta et al.

(10) Patent No.: US 8,494,231 B2
(45) Date of Patent: Jul. 23, 2013

(54) FACE RECOGNITION IN VIDEO CONTENT

(75) Inventors: Florin O. Folta, Redmond, WA (US); Yaming He, Redmond, WA (US); King Wei Hor, Redmond, WA (US); Minesh G. Shilotri, Kirkland, WA (US); Stacey Spears, Sammamish, WA (US); Chuang Gu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 281 days.

(21) Appl. No.: 12/916,895

(22) Filed: Nov. 1, 2010

(65) Prior Publication Data
US 2012/0106806 A1  May 3, 2012

(51) Int. Cl.
*G06K 9/00* (2006.01)
(52) U.S. Cl.
USPC .......................................... 382/118; 382/224
(58) Field of Classification Search
None
See application file for complete search history.

(56) References Cited

U.S. PATENT DOCUMENTS

| | | | |
|---|---|---|---|
| 2004/0264780 A1* | 12/2004 | Zhang et al. | 382/224 |
| 2006/0008152 A1 | 1/2006 | Kumar et al. | |
| 2006/0187305 A1 | 8/2006 | Trivedi et al. | |
| 2008/0267461 A1* | 10/2008 | Ianculescu et al. | 382/118 |
| 2009/0141949 A1* | 6/2009 | Lee et al. | 382/118 |
| 2010/0310134 A1* | 12/2010 | Kapoor et al. | 382/118 |

FOREIGN PATENT DOCUMENTS
WO    2005096213 A1   10/2005

OTHER PUBLICATIONS

Content-Based Indexing of Images and Video Using Face Detection and Recognition Methods—Published Date: 2001 http://citeseerx.ist.psu.edu/viewdoc/download?doi=10.1.1.120.4188&rep=rep1&type=pdf.
Towards Robust Face Recognition from Video—Published Date: Oct. 2001 http://citeseerx.ist.psu.edu/viewdoc/download?doi=10.1.1.100.320&rep=rep1&type=pdf.
Face Detection and Tracking in a Video by Propagating Detection Probabilities—Published Date: Oct. 2003 http://www3.ee.surrey.ac.uk/CVSSP/Publications/papers/varma-pami-2003.pdf.
Recognizing Faces in Broadcast Video—Published Date: Sep. 1999 http://www.research.ibm.com/people/a/aws/documents/papers/SeniorRATFG99.pdf.
Face Recognition from Video by Matching Image Sets—Published Date: Dec. 2005 http://ieeexplore.ieee.org/stamp/stamp.jsp?tp=&arnumber=1587630.
Fast Training and Selection of Haar Features using Statistics in Boosting-Based Face Detection—Published Date: 2007 http://webtools.sharkdolphin.com/pfn/accion.php?dir=./minhtri/publications/papers&cal=PhamCham-ICCV07-final-Xplore_compatible-1.1.pdf&accion=descargar&id=2&PHPSESSID=e5ba2e28e7719ac6291bd99a6d01075c.
Face Detection, Tracking, and Recognition for Broadcast Video—Retrieved Date: Jul. 28, 2010 http://satoh-lab.ex.nii.ac.jp/users/led-duy/pub/BookChaper-Face-Final-Revised.pdf.

* cited by examiner

*Primary Examiner* — Bhavesh Mehta
*Assistant Examiner* — Siamak Harandi
(74) *Attorney, Agent, or Firm* — Gonzalez Saggio & Harlan LLP (57) ABSTRACT

The subject disclosure relates to face recognition in video. Face detection data in frames of input data are used to generate face galleries, which are labeled and used in recognizing faces throughout the video. Metadata that associates the video frame and the face are generated and maintained for subsequent identification. Faces other than those found by face detection may be found by face tracking, in which facial landmarks found by the face detection are used to track a face over previous and/or subsequent video frames. Once generated, the maintained metadata may be accessed to efficiently determine the identity of a person corresponding to a viewer-selected face.

17 Claims, 7 Drawing Sheets

FACE RECOGNITION IN VIDEO CONTENT

BACKGROUND

Many video content consumers seek to interact with the video content. For example, users pause, rewind, fast forward and otherwise control their viewing experience. These are well-known concepts, however other types of interaction are likely wanted by many users.

One desired type of interaction is to be able to use a personalized video service or the like to explore what is embedded in the video content. By way of example, a user may wish to find out the identity of an actor in a certain scene, and/or (even if the actor's identity is known), find out something more about that actor, e.g., biographical information. At present, to find out more about the cast of a television show or movie, a user can go to the internet, which includes at least one website that has global information on a per-show basis. There, the user can look up the show on such a site, and look through a gallery of images until find the actor of interest is found.

Rather than manually going to the internet, a service that provided more automated user interaction scenarios (such as to pause a show and request automatic identification of an actor appearing at that time) would need to depend on face recognition. However, face recognition is one of the most challenging tasks for machine learning, because factors such as luminance condition, pose position and facial expression significantly impact the final precision and recall result. Further, face recognition is complex because people age and otherwise change over time, e.g., go from bearded to clean-shaven, sometimes wear a hat, and so forth. Heretofore there has been no known way to provide support for such an automated service.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which faces may be recognized from input video. Face detection data corresponding to a face detected in an input video frame (e.g., by a face detection module) is matched against face identification data, e.g., maintained in a face gallery, to recognize the face. Metadata that associates the video frame and the face with the face identification data is generated and maintained for subsequent identification. Additional faces may be found by face tracking, in which the face detection data is used as a basis for tracking a face (e.g., via facial landmarks) over one or more previous and/or subsequent video frames.

In one aspect, the face galleries may be generated by grouping faces based upon similarity data such that each set of similar faces are placed in the same candidate group. A candidate group may be divided into more than one candidate group based upon the similarity data, and/or a candidate group may be combined with another based upon the similarity data into a single candidate group based upon the similarity data. Candidate groups may be filtered, such as by discarding a candidate group if any face in that group appears to not be of the same person. Remaining faces are then added to one of the face galleries, which are each labeled with the face identification data.

In one aspect, the maintained metadata may be accessed to efficiently determine the identity of a person corresponding to a viewer-selected face. For example, upon receiving a request to identify a viewer-selected face that is associated with a video frame number, the metadata may be accessed to determine whether face identification data exists for that viewer-selected face. If so, information corresponding to the face identification data (e.g., the person's name) may be returned in response to the request.

In one aspect, a face recognition pipeline is provided that includes a face detection module that provides the detected face data, a face grouping module that groups faces by similarity to produce the galleries, a face tracker that tracks detected faces over adjacent frames, and a face recognition mechanism that matches faces in the input video with faces in the face galleries to output information (e.g., metadata) corresponding to recognized faces in the input video. The information may be accessed as needed to identify a person, given a viewer-selected face in a video frame.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards achieving practical and efficient face recognition in video. To this end, one implementation runs input on-demand video through a processing pipeline having integrated modules that perform face detection, face tracking, face grouping and face recognition. As described herein, the pipeline may output face-related metadata (e.g., ShowID, frame number, location in frame, ActorID) that then can be used to efficiently identify a person in video with high precision and recall performance.

It should be understood that any of the examples herein are non-limiting. For one, while television shows and movies are used as examples of processed video with respect to identifying actors, other applications such as identifying persons in a meeting, processing security footage, and so forth may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in video processing in general.

Figure 1:
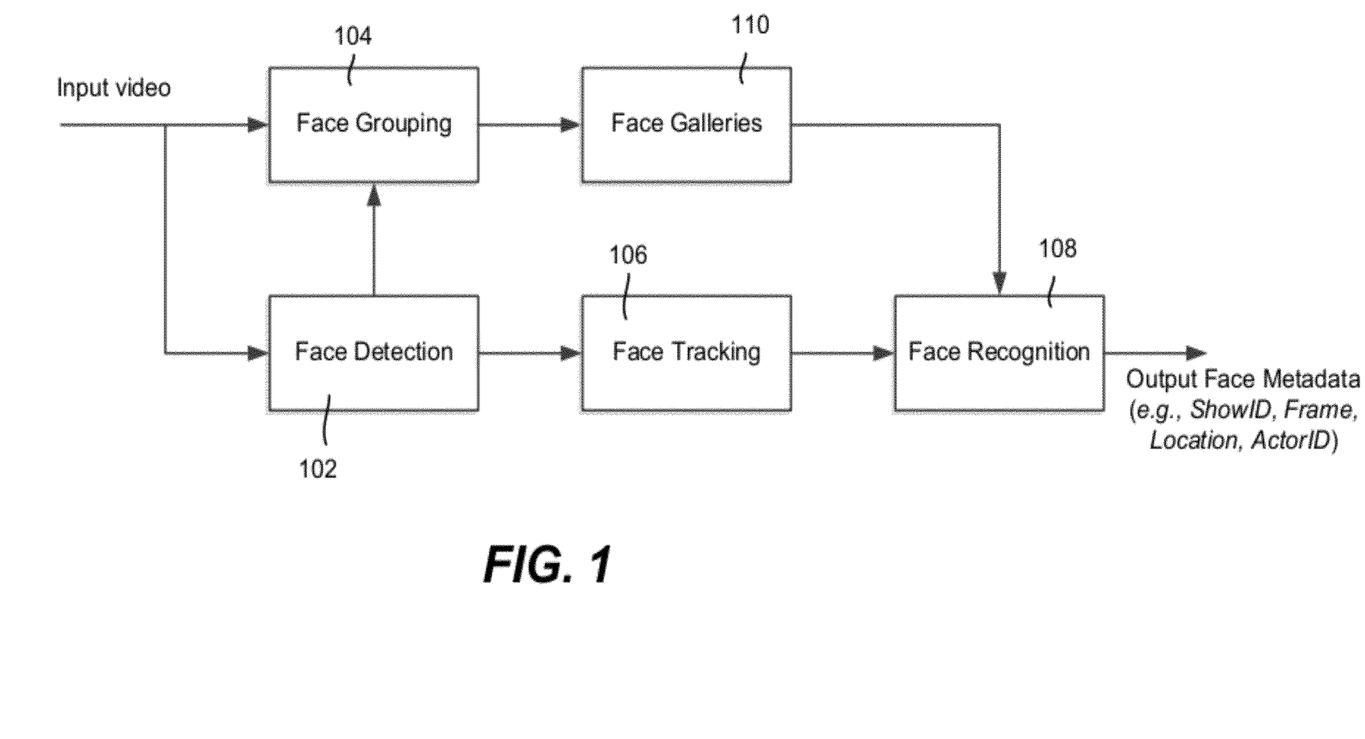
FIG. 1 is a block diagram representing example components of a face recognition pipeline.

FIG. 1 shows example components of the processing pipeline, including a face detection module 102, face grouping module 104, face tracking module 106 and face recognition module 108. Input video is fed to the face detection module 102, which detects positions of faces that appear in frames of the input video. In general, face detection finds the possible faces in each video frame, such as via a Haar feature detector with multiview support where the pose position is taken into account. Face detection is a generally known technology, such as described in U.S. Pat. No. 7,689,033, and as such is not further described in detail herein except to note that for any processed frame containing a face that can be detected, the face detection module 102 outputs result data as to one or more faces in that frame to the face grouping module 104 and the face tracking module 106.

Note that as described below, for efficiency, each frame of input video need not be processed by the face detection module, but rather some reduced sampling rate reduced sampling rate or reduced resolution may be used, such as to process every fourth frame, every tenth frame or other rate, e.g., depending on available resources and time. Also note that the face detection may use one sampling rate for gallery generation, e.g., every fourth frame, and a different rate, such as every frame, for face tracking and recognition as described below. In general, gallery generation and face tracking are wholly independent processes, but may be performed in parallel, including with the same data generated by the face detection module 102.

Another way to obtain images of faces is from the internet. The faces of many well-known people are already freely available, including with labels.

The face grouping module 106 generates one or more face galleries 110 based on the detected faces that correspond to the results data from the face detection module 102 and/or similar data obtained from other images. To this end, the face grouping module 106 evaluates features in the face and groups together those faces having similar features. In one implementation, the face grouping module 106 measures the similarity matrix between each detected face in the entire video content, and groups them into a number of face galleries based on their similarity to one another.

In this manner, face grouping groups a set of faces into a number of groups that each contains similar faces. Note that face grouping can have other uses and other techniques may be used in generating the gallery images. For example, the faces from one television show episode (or some lesser subset) may be grouped and tagged, and used as the gallery images for the full set of episodes. This improves the precision of the recognition because an actor/actress usually looks similar across the whole series. Face grouping may also be used to directly tag grouped faces without face recognition, which, for example, may be useful for movies or television shows which tend to have different actors/actresses (e.g., a talk show).

In each face gallery, ideally all of the detected faces will belong to the same person, however errors can occur. Moreover, the ideal situation is to have only one gallery for one person, however it is possible that one person may have more than one gallery associated with him or her, such as because of dramatic luminance differences, or significant facial expression changes, for example. A maximum allowed similarity measurement difference or some other mechanism may be used to separate galleries from one another. Galleries may likewise be combined based on having close similarity scores.

Also, faces in a gallery that are virtually identically similar may be filtered out such that highly repetitive data can be eliminated.

As part of generating the face galleries 110, a manual (or machine vision-based) process may be applied to label the generated face galleries, generally with little effort for each gallery. For example, a straightforward tool may be provided that shows some practical number of faces in a gallery (or subset thereof) to a human judge, (such as of a crowd-sourcing service that pays participants for such input), and which simply asks whether all faces shown are of the same person or not. A gallery (or displayed subset thereof) may be discarded if even one face does not appear to the judge to be that of the same person. Note that the discarded faces may be used (e.g., in a feedback loop) to improve subsequent grouping, such as the grouping performed on subsequent episodes in TV series.

A name label is tagged to each set of faces (e.g., gallery) that is kept; because of the precision of current face grouping technology, the tagging process is efficient, usually needing only one click for a group of faces. More complex tools, such as based on judges' confidence scores, and/or one that allows a judge to simply eliminate an outlier face and keep the rest, may be alternatively employed.

Another part of the pipeline is directed towards gathering more face data, such as from the frames that were not sampled and processed by the face detection module 102, or frames in which a face was present but was not able to be detected. To this end, the face tracking module 106 attempts to track the detected face location in temporal time domain in order to find any missing faces.

Figure 2A:
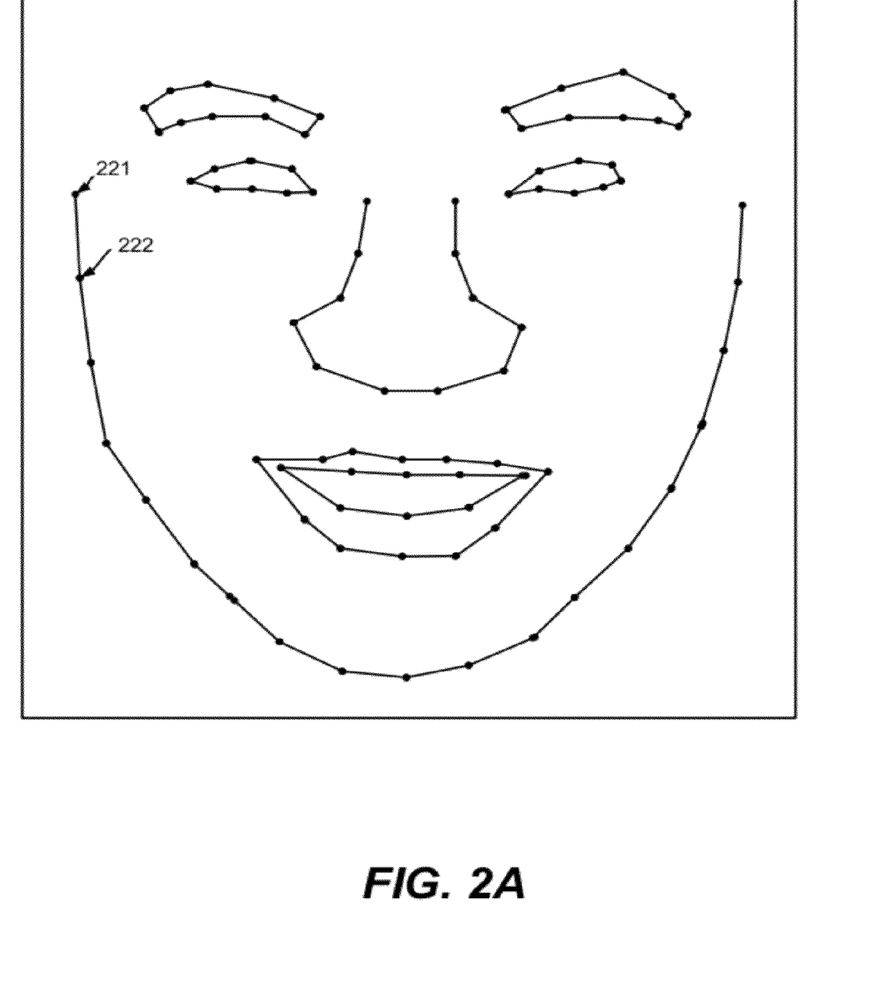
FIG. 2A is representation of frontal facial landmarks that may be used in tracking a face among video frames.
Figure 2B:
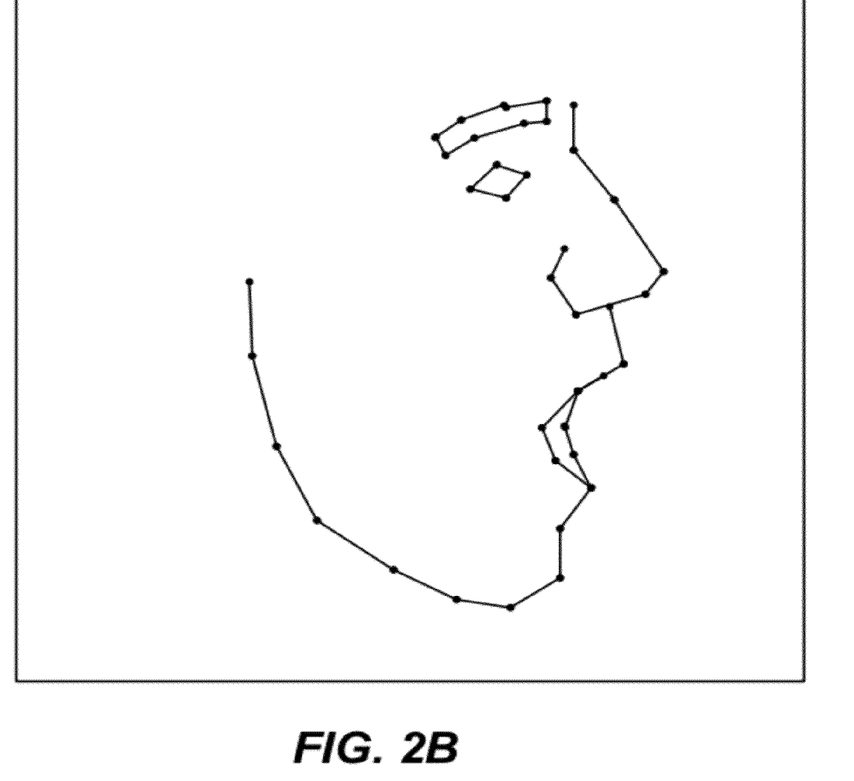
FIG. 2B is representation of profile facial landmarks that may be used in tracking a face among video frames.

In general, face tracking is the process of locating face objects in a video sequence. Based on initial detected faces at a current video frame as provided as results by the face detection module 102, the face tracking module 106 analyzes the surrounding/adjacent input video frames in order to follow the location of (e.g., moving) faces within the preceding and subsequent video frames. More particularly, the facial model-based tracking system uses the explicit definition of facial feature points from the face detection module 102 that tend to reliably describe the physical location of significant facial landmarks on the face, as generally represented in FIGS. 2A and 2B, which show how frontal and profile facial landmarks, respectively, are able to be represented by points/segments as data. The face tracking module 106 estimates and tracks the movement of these landmarks in the preceding and subsequent video frames.

For clarity, only two points 221 and 222 are labeled in FIG. 2A, however it is understood that any points may be associated with an identifier, and that other points and/or features may be used, as well as fewer points or more points. As can be readily appreciated, the face tracking module 102 may utilize the landmark patch detection, and their movement and alignment in the temporal domain by leveraging a generalized facial model trained with various landmark data such as ratios which remain the same during zooming in or out, mathematical adjustments for rotation, and partial occlusion. Assumptions need not be made about the background, camera motion, or the number of faces in a frame; an arbitrary number of faces can be tracked simultaneously, for any length of time within a scene cut. An occlusion situation is handled by the recovery of tracking capability within a scene cut.

Figure 3:
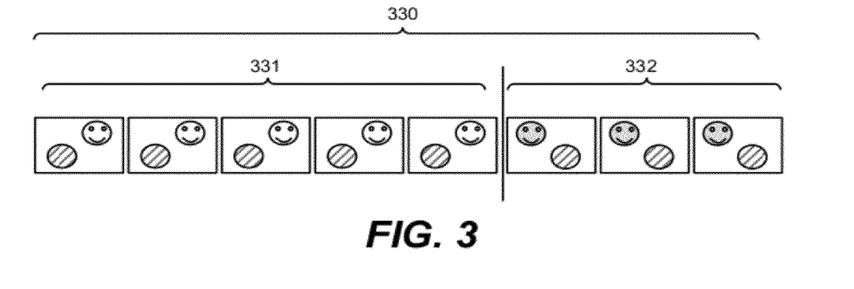
FIGS. 3-6 are representations of video frames over time, illustrating face detection and face tracking.

By way of example of face tracking, FIG. 3 shows a scene 330 comprising a collection of two shots 331 and 332, where a shot is a set of frames as separated by a shot boundary (the vertical line in FIG. 3 to 6). For example, FIG. 3 to 6 may be showing a scene comprising a conversion that switches between two points of view, with each point of view being a shot.

Figure 7:
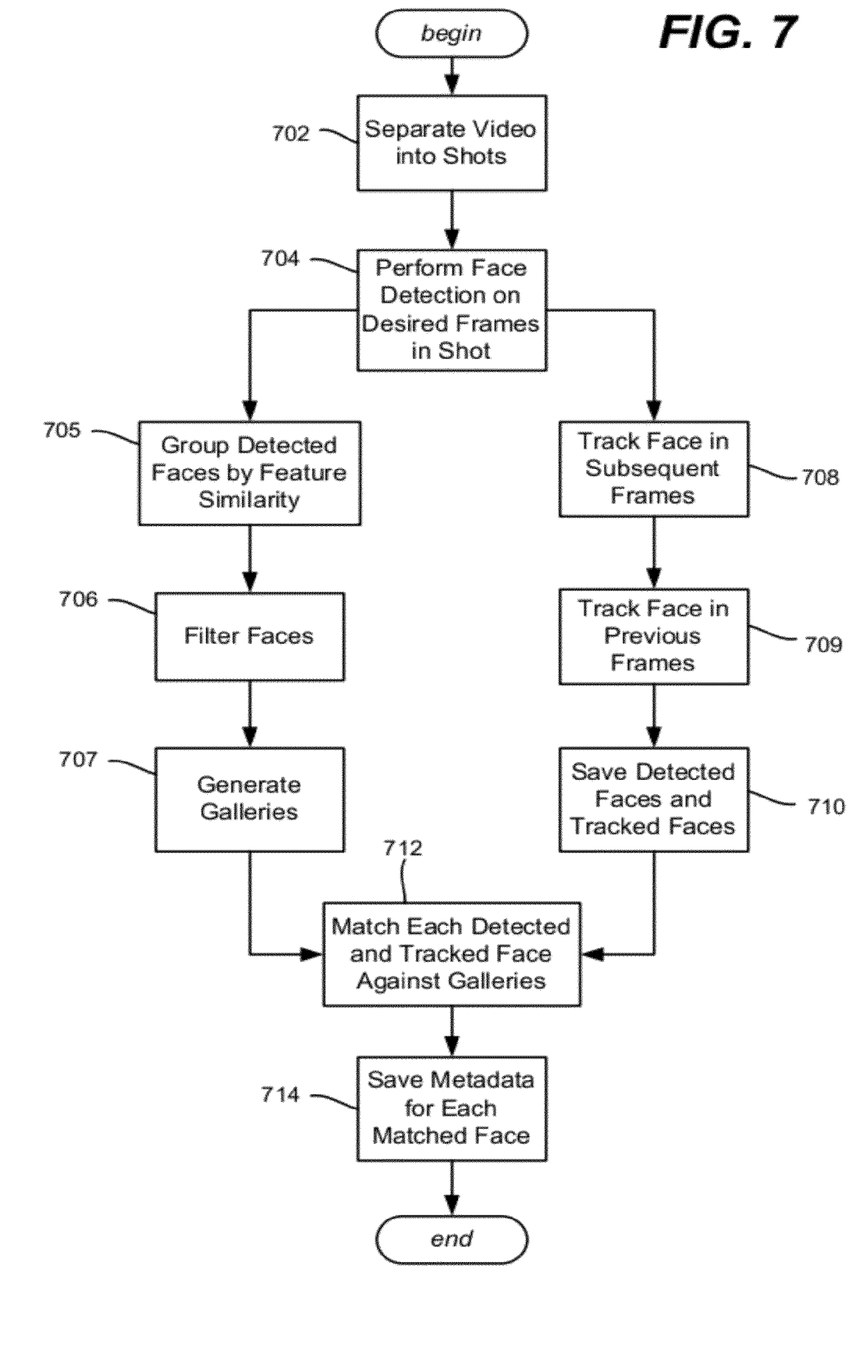
FIG. 7 is a flow diagram showing example steps that may be performed by the face recognition pipeline.

An early step, generally represented at step 702 of the flow diagram of FIG. 7, identifies the different shots, which provides a relatively low level basis with which to work. Note that this allows processing each shot in parallel, although FIG. 7 represents example logic for any single shot. Shot boundary detection is a well-known technology.

Figure 4:
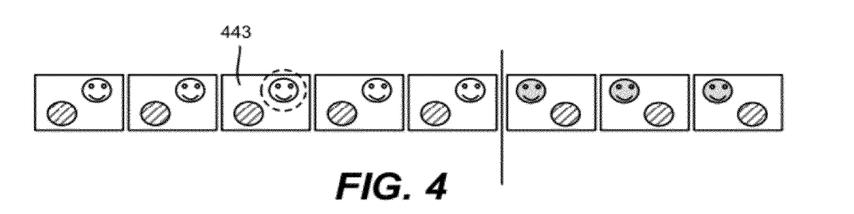

Step 704, along with FIG. 4, represent the result of the face detection module 120 processing a single shot. In general, face detection works best when the subject is staring into the camera, as face orientation, skin color, lighting conditions and other factors may affect the performance of the detection algorithm. In the example of FIG. 4, the detection does not find a face until the middle of the shot, as indicated by the dashed circle in the frame labeled 443. Also note that as set forth above, face detection may not process each frame, and instead only sample some frames, whereby frames may be skipped even when a face may be clearly detected by the face detection module 102.

Steps 705-707 (which may be a separate process and need not be concerned with shot boundaries) are directed to gallery generation and have been described above. To summarize, step 705 represents grouping the faces by the similarity of their detected features, step 706 represents filtering faces (e.g., eliminating overly redundant data and/or any groups with faces of two or more different people in them), and step 707 represents generating the galleries by saving the groups with their labeled names.

Figure 5:
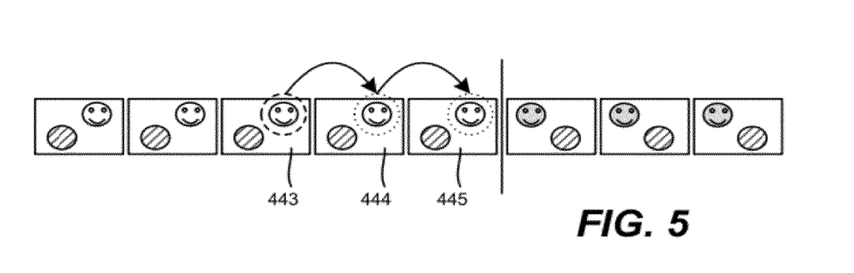

Steps 708-710 are directed towards face tracking. FIG. 5, corresponding to step 708, shows how the face tracking module 106 assists in detection. Once the face detection module 120 has found a face via step 704, the face tracking module 106 is likely to be able to stay locked on the face through the remainder of the shot via the landmarks. Even as the face turns sideways (that is, becomes a profile view) as generally represented in FIG. 2B, the face tracking module 106 is typically able to track the feature points of the face through pose estimation.

Figure 6:
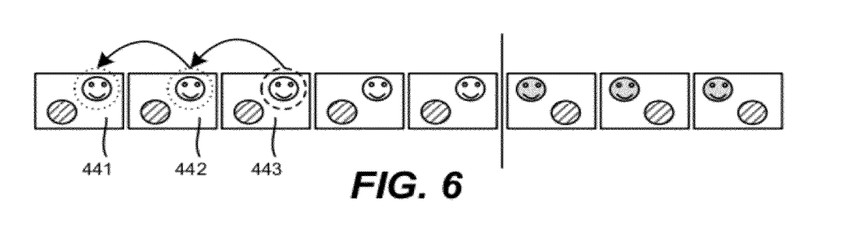

In FIG. 6, corresponding to step 709, represents the face tracking module 106 working in reverse frame order. In keeping with the above example, the face detection did not occur until the middle of the shot at frame 443. By tracking in reverse, the face tracking module 106 identifies a face in frames 441 and 442 that was not previously detected, e.g., because of the inability of the face detection module 102 to locate one, or because of skipping over those frames.

Thus, based on the facial modeling of detected initial faces, face tracking finds more opportunities to follow temporally correlated faces where spatial face detection alone cannot find them, and thereby improves precision by discovering more faces in a video sequence with higher confidence. Note that face tracking also reduces false detections in the video sequence because such false data tends to persist only for short durations with relatively low confidence. Moreover, by training the face tracking module with additional facial landmarks for semi-profile and profile faces, shaped-based motion estimation for the facial landmarks is able to provide the temporal trajectory of those detected faces.

Once the faces have been detected and/or tracked, the faces are measured with respect to the feature distance to each reference face in the face galleries. 110 The face with the minimal distance to the test sample represents a match of face recognition. For example, the face in frame 441 of FIG. 6 is now known to belong to a particular person. Note that if the distance is too large, then a "no match" state may be generated; in this manner, for example, every bit-part actor that appears on a show, who may not be identifiable for gallery labeling purposes, need not be incorrectly matched to someone else simply because that person is closest.

The metadata that identifies people in a show may then be saved, as generally represented by step 714. An efficient way is to maintain metadata that identifies which person is present in which frame (timestamp) of which show at which location, e.g., {ShowID, frame number, location in frame, ActorID}. Other ways of formatting the metadata, e.g., via one or more GUIDs may be used, however in general, the metadata allows an unknown face in a show, frame, and frame location to be efficiently matched to an identity (if previously recognized).

In one implementation, every frame that contains a recognized face will have metadata. Ranges of frames and/or locations may be maintained for efficient storage when the person does not move within a series of frames. Also note that crowd-sourcing, in which the public provides data such as to label an actor, also may be used to recognize otherwise unknown persons for which metadata may be maintained.

Note that while a television series may be used as the input video, improved precision and recall has been found to exist when one or more episodes of that television series are separately processed as input video. Also, for a series in which most actors remain the same, only a subset of the episodes of that series may be processed to build the galleries, with face recognition run on the various episodes. Thus, as used herein, "show" may mean movie, episode, series, or some subset thereof, and gallery generation may be independent of face recognition against the galleries.

Figure 8:
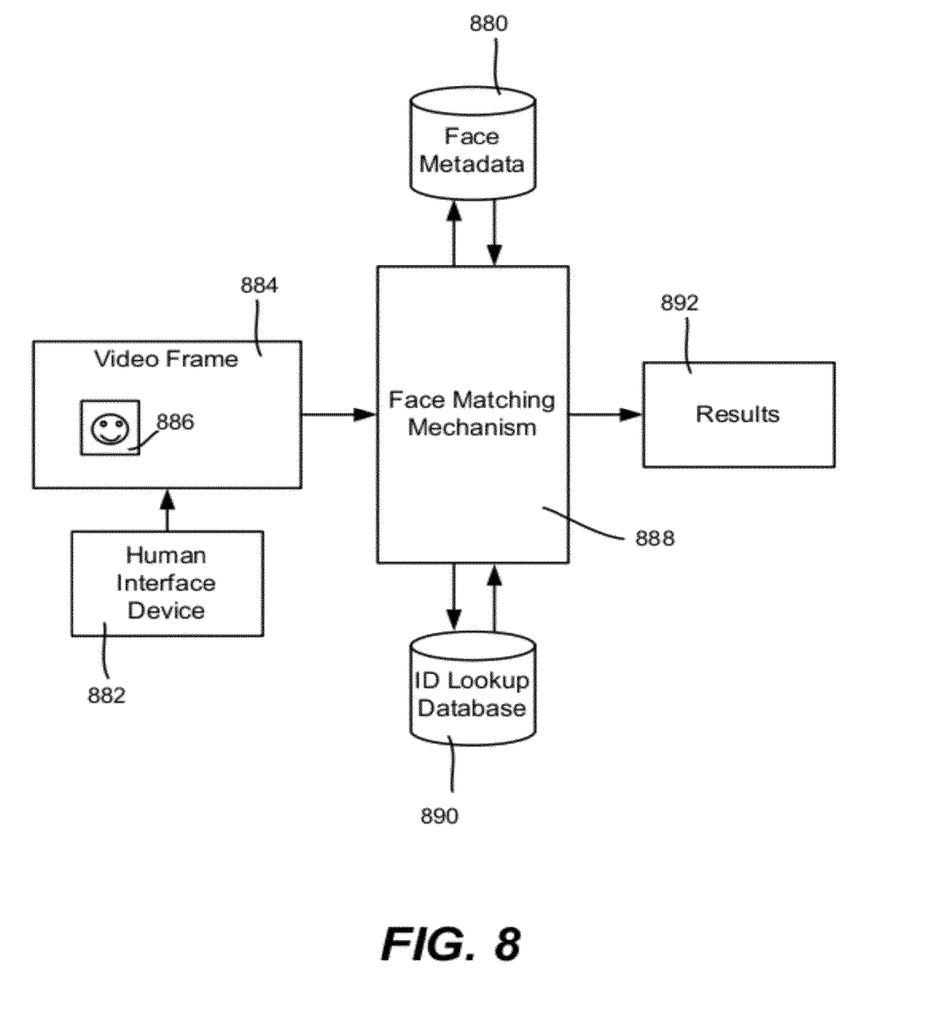
FIG. 8 is a block diagram representing example components for using face recognition data provided by the pipeline to subsequently identify a selected face.

FIG. 8 shows an example of how a viewer may use saved face metadata 880 to identify a person and have biographical or other data retrieved for that person. For example, via a human interface device 882 such as a remote control of a television set, a game console, a mouse on a computer on which the viewer is watching a show or the like, a viewer may interact with the show. For example, if a viewer interacts to pause a frame 884 and select a person in that frame, (e.g., by drawing a box 886 around the person or pointing/hovering a cursor or the like at the person), the frame and location is known. If the show has been processed as described above, the metadata 880 may be accessed by a face matching mechanism 888 with the {ShowID, frame number, location in frame} to find the ActorID. The ActorID in turn may be used to lookup a database 890 to provide results that, for example, identify who that person is in that frame, provide biographical information about that person, provide links to more data, and so forth.

In an alternative implementation, or if for example the face requested for identification is not matched in the metadata, dynamic face recognition can be attempted, including by matching features against the existing galleries 110 or other sources. While likely not as efficient as metadata-based lookup, the facial features may be used to match a person to the clipped image (or possibly match a set of candidates as to who that person might be) and return such information to the user.

Note that any or all of the components and functionality of FIG. 8 may be on a client-side device, or some functionality (other than the human interface device and display mechanism that shows the frame) may be provided by a remote service. For example, a client may send the face metadata to a service that then performs the lookup, or the client may send facial features (or the image of the face) to a service that performs face recognition.

The results may be sent back and/or output in any appropriate way, e.g., by superimposing them above the screen image, by email, text message, and so forth. A user may interact to subscribe to a specific interesting person's "channel" where information about new or old content related to that particular person may be automatically notified to the user in various ways, such as an entire movie or television show, episode, scene, a frame with updated news, and/or related people with respect to that person.

Exemplary Operating Environment

Figure 9:
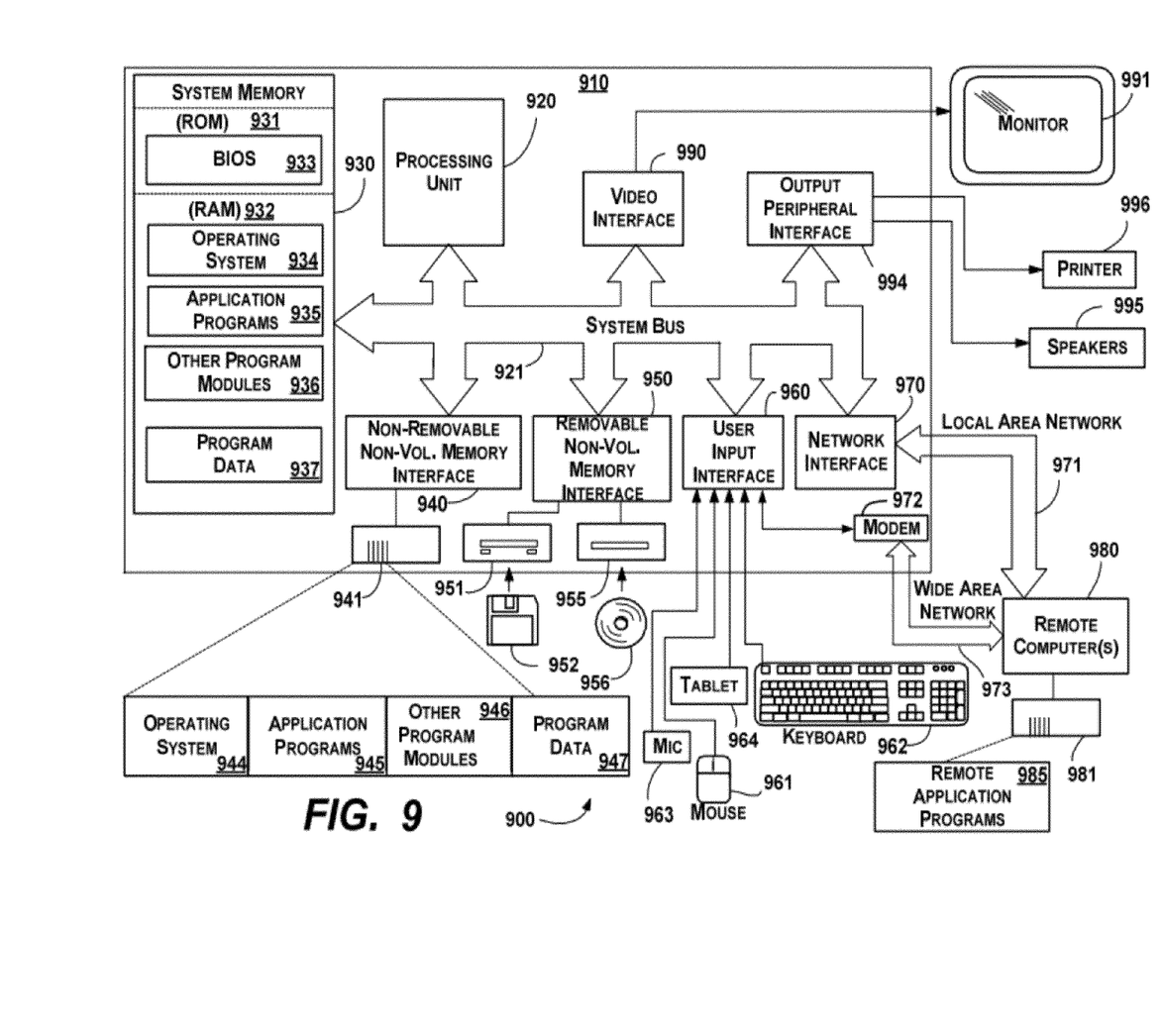
FIG. 9 shows an illustrative example of a computing environment into which various aspects of the present invention may be incorporated.

FIG. 9 illustrates an example of a suitable computing and networking environment 900 on which the examples of FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are exemplary and other means of establishing a communications link between the computers may be used.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor, comprising, receiving face detection data corresponding to a face detected in an input video frame, building face galleries, including grouping faces detected in input video frames into candidate groups based upon similarity data, filtering at least some faces from a candidate group, adding remaining faces to one of the face galleries, and labeling each face gallery with the face identification data, matching the face detection data against face identification data maintained in a face gallery among a plurality of face galleries to recognize the face in the input video frame, and generating metadata that associates the video frame and the face with the face identification data.

2. The method of claim 1 further comprising, tracking the face that is detected in the input video frame over one or more subsequent frames, and generating metadata that associates each of the one or more subsequent frames with the face identification data.

3. The method of claim 1 further comprising, tracking the face that is detected in the input video frame over one or more previous frames, and generating metadata that associates each of the one or more previous frames with the face identification data.

4. The method of claim 1 further comprising, dividing a candidate group into at least two candidate groups based upon the similarity data.

5. The method of claim 1 further comprising, combining two or more candidate groups into a single candidate group based upon the similarity data.

6. The method of claim 1 wherein filtering at least some of the faces from the candidate group comprises discarding a candidate group if any face in that group appears to not be of the same person.

7. The method of claim 1 further comprising, receiving a request to identify a viewer-selected face, the request associated with a video frame number, accessing the metadata to determine whether face identification data exists for that viewer-selected face, and if so, returning information corresponding to the face identification data in response to the request.

8. In a computing environment, a system comprising, a face recognition pipeline that recognizes faces from input video, including a face grouping module configured to group faces into groups by similarity based upon face detection data provided by a face detection module data, the grouping module further configured to provide face galleries corresponding to the groups, including information that identifies each person associated with a face in a face gallery, the face recognition pipeline further comprising a face recognition mechanism that matches faces in the input video with faces in the face galleries to output information corresponding to recognized faces in the input video, wherein the input video comprises a full set of episodes, wherein the face grouping module groups faces using a lesser subset of the episodes, and wherein the face recognition mechanism matches faces for the full set of episodes.

9. The system of claim 8 further comprising a face tracking module configured to track a face in one or more frames adjacent a frame for which the face detection module data provided face detection data.

10. The system of claim 9 wherein the face tracking module is configured to estimate and track facial landmarks in the one or more adjacent frames to track the face.

11. The system of claim 9 wherein the face recognition mechanism matches faces tracked by the face tracking module to output at least some of the information corresponding to the recognized faces.

12. The system of claim 8 wherein the information corresponding to recognized faces in the input video comprises metadata from which a person in a show or movie at a given frame and location in that frame is identifiable.

13. The system of claim 12 further comprising a mechanism configured to access the metadata to identify a person given a show or movie, a given frame and a location in that frame.

14. The system of claim 8 wherein the face detection module provides the data to the face grouping module for a sampling of less than the set of available frames of the input video.

15. One or more computer-readable storage media having computer-executable instructions, which when executed perform steps, comprising:
   receiving face detection data corresponding to a face detected in an input video frame, wherein the face detection data corresponds to similarity data;
   tracking the face in one or more adjacent video frames based on at least some of the face detection data to acquire a tracked face; and
   utilizing the similarity data to determine whether the tracked face matches a threshold level of similarity; and
   maintaining the tracked face in a face gallery in a single candidate group, wherein the tracked face from each video frame among the one or more adjacent video frames is maintained in the face gallery.

16. The one or more computer-readable storage media of claim 15 wherein upon detecting an undetected face in the one or more adjacent video frames, a reverse order tracking of the one or more adjacent video frames is conducted, wherein the reverse order tracking comprises analyzing all video frames that appear prior to the video frame in which the undetected face is located.

17. The one or more computer-readable storage media of claim 15 having further computer-executable instructions comprising, generating metadata that associates face identification data with the input video frame and each adjacent video frame.

* * * * *